Aug. 13, 1968      H. GEYER ETAL      3,396,506
ARTICLE-PACKING MACHINES

Filed July 22, 1966     3 Sheets-Sheet 1

INVENTORS
HERBERT GEYER et al

Aug. 13, 1968    H. GEYER ET AL    3,396,506
ARTICLE-PACKING MACHINES
Filed July 22, 1966    3 Sheets-Sheet 2
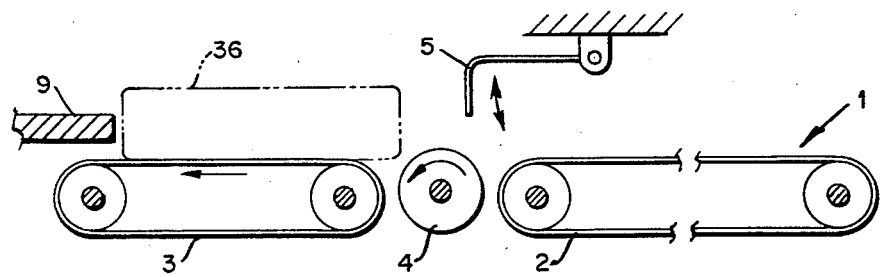
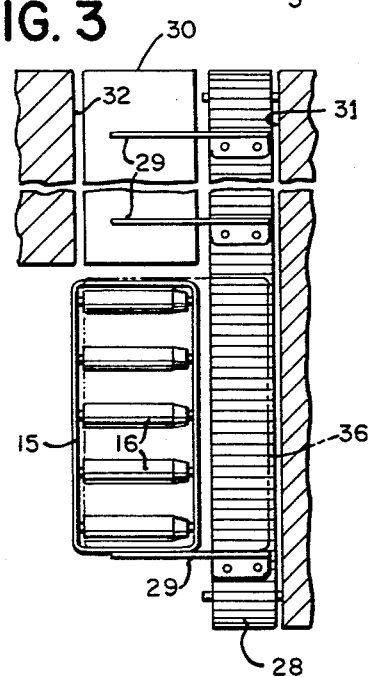
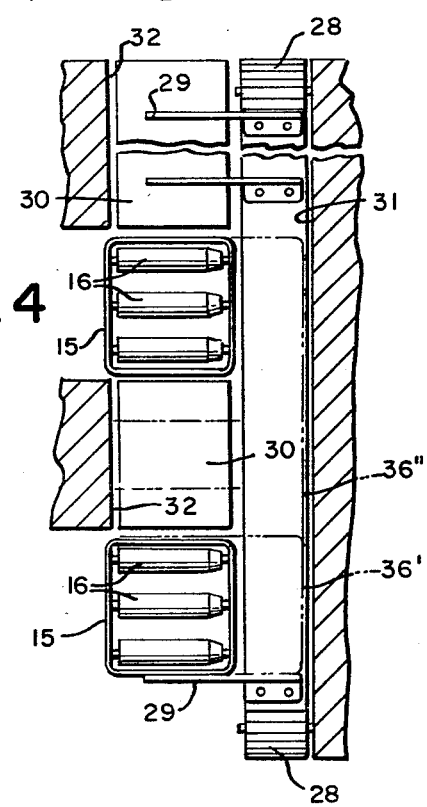
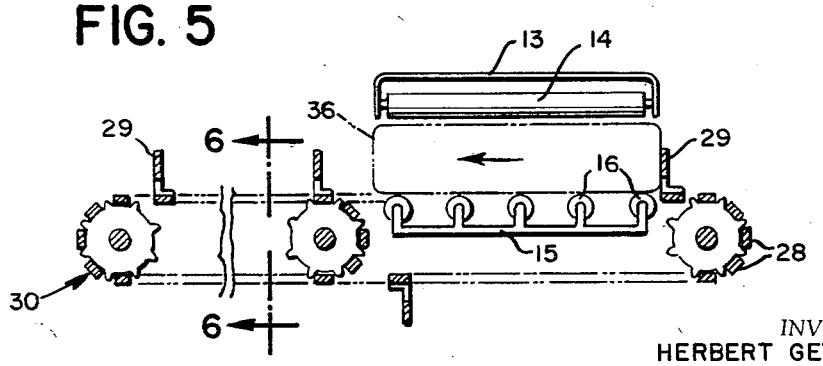
INVENTORS
HERBERT GEYER et al Aug. 13, 1968     H. GEYER ET AL     3,396,506
ARTICLE-PACKING MACHINES Filed July 22, 1966     3 Sheets—Sheet 3

INVENTORS
HERBERT GEYER et al

United States Patent Office 3,396,506
Patented Aug. 13, 1968

3,396,506
ARTICLE-PACKING MACHINES
Herbert Geyer and Heinz Minar, Dresden, Germany, assignors to VEB Tabak- und Industriemaschinen Dresden, Dresden, Germany
Filed July 22, 1966, Ser. No. 567,139
14 Claims. (Cl. 53—112)

The present invention relates to machines for packing articles.

In particular, the present invention relates to machines for packing blocks, such as blocks of frozen fish, in sealable sheet material, which may be evacuated before being sealed, under conditions where the machine is moving in a given direction as well as changing its attitude, such conditions being present, for example, when such a machine is mounted on board a ship at sea.

There is a need for modern fishing vessels, which sail on the high seas, to be equipped with packing machines in order to pack frozen blocks of fish in sealable sheet material, such as thermoplastic sheet material, after the packages have been evacuated, so that when the fishing vessel lands, the frozen fish will already be hygienically packed and ready for further shipment.

While a number of known packing machines are capable of packing articles in sealable sheet material, none of the known machines are capable of fulfilling the requirements encountered on the high seas.

Thus, there is one type of known packing machine which uses a finished tube of sheet material into which the articles are introduced. This type of packing machine is, however, unsuited for frozen fish blocks since the relative movement between the articles, such as the frozen fish blocks, and the sheet material will easily result in cutting and tearing of the tube of sheet material as a result of the sharp edges of the fish blocks.

Another type of known packing machines folds the package and seals the latter by pressing partions thereof against the articles which are packed in the package. This type of machine is unsuited for the above purposes because sealing, as by heat sealing or welding, against the fish block is not possible because of the properties of the surface of the frozen fish block. Also, heating of the frozen fish block is undesirable.

Another type of known machines takes an elongated strip of sheet material and directs it through a forming tube which forms the sheet material into a tubular configuration, and the articles which are to be packed are directed into the forming tube so as to be surrounded by the tube of sheet material formed therein. This type of machine is also unsuitable for the above purposes because it is hardly possible during travel of a ship at sea to properly position the fish blocks for movement into and along the forming tube. Furthermore, such machines occupy too much space because of the size of the forming tube and the sheet material supply structure.

There is also a known type of packing machine in which the articles which are to be packed are displaced through a plane occupied by a curtain of the sheet material which forms the packages, so that the sheet material initially takes a substantially U-shaped configuration about each article and is then folded or sealed along the lateral and transverse edges of the article. This type of machine is best suited for use for packing blocks of fish, but none of the known machines of this type are capable of fulfilling all of the requirements encountered on a fishing vessel which is at sea.

A number of known machines, particularly those which form folded packages, use rotary article-transporting devices which include star wheels which rotate about an horizontal axis. These star wheels are provided with article-receiving pockets in which the articles are received, with the packing sheet material in a U-shaped configuration surrounding the articles, and dring the stepwise turning of the star wheels the articles situated in the sheet material are placed in engagement with folding elements which finish the folded package. The rotary star wheels are situated with such machines between a feeding means which feeds the articles to the star wheels and a discharge means which takes the packed articles from the star wheels to discharge them to a predetermined location. The axis of turning of the rotary star wheels extends transversely to the direction in which the articles are fed to the star wheels and discharged therefrom. The construction of such star wheels is suitable for handling relatively small articles but not for the purpose of handling articles such as blocks of frozen fish, which are not only cold and sharp but also relatively of substantial dimensions. In addition, the arrangement of the feeding means, rotary star wheels, and discharge means one after the other in a row, in the direction of movement of the articles through the machine, requires the entire machine to occupy a space which is far too long to render such machines suitable for use on a fishing vessel.

It is accordingly a primary object of the present invention to provide a packing machine which will avoid all of the above drawbacks and which in particular is suited for installation on a ship at sea.

It is thus an object of the present invention to provide a machine which is capable of efficiently packing blocks, such as blocks of frozen fish, in such a way that during the handling of the blocks they are reliably guided and held in the machine so that even though the direction of movement of the machine is continuously changing, depending upon the direction of movement of the ship, and even though certain forces of acceleration act on the machine and its attitude is changing due to rolling and pitching movement of the ship, nevertheless the machine is capable of operating during travel of a ship which is provided with the machine of the present invention.

Furthermore, it is an object of the invention to provide a machine of the above type which requires such a small amount of space that it can without difficulty be accommodated on a fishing vessel.

Primarily, the machine of the invention includes a feeding means which will feed the articles, such as the blocks of fish, in a given feeding direction along a predetermined substantially horizontal feeding path which extends transversely with respect to the direction in which the machine tends primarily to move with the ship as a result of the movement of the latter, this feeding means feeding the articles in a predetermined feeding plane. A discharge means is provided for horizontally discharging the packed articles along a horizontal path parallel to the feeding path and situated substantially at the same elevation but laterally spaced from the feeding path.

A rotary transverse transporting means is arranged between the feeding and discharge means and has an axis of rotation which extends parallel to the directions in which the articles are moved by the feeding and discharge means, this axis of rotation of the rotary transverse transporting means being situated above the feeding plane by a distance approximately equal to one half the thickness of the blocks. The sheet material which forms the packages extends substantially vertically between the feeding means and the transverse transporting means, and there is also situated at this location, adjacent the sheet material, a sealing means for sealing the sheet material. A supporting roller means is provided between the feeding means and the transporting means for supporting the articles during their movement from the feeding means to the transporting means, and a shifting means is provided for shifting the articles from the feeding means into one of a plurality of article-gripping means which are carried by the rotary transverse transporting means. Situated over the turning axis of the transverse transporting means, between the feeding and discharge means, is a second sealing means, which may be combined with an evacuating means for evacuating the packages. This second sealing means and the evacuating means are located at a predetermined working station to which the articles are successively transpotred by the transverse transporting means, while the articles are held by the article-gripping means.

The invention is illustrated by way of example in the accompanying drawings which form part of this application and in which:

FIG. 2 is a longitudinal sectional elevation taken along lines 2—2 of FIG. 1 in the direction of the arrows and schematically illustrating the feeding means of the machine;

FIG. 3 is a schematic fragmentary partly sectional plan view of the discharge means of the machine, taken along line 3—3 of FIG. 1 in the direction of the arrows;

FIG. 4 is also a fragmentary sectional plan view of a discharge means, but the discharge means of FIG. 4 is somewhat different from that of FIG. 3;

FIG. 5 is a longitudinal sectional elevation taken along line 5—5 of FIG. 1 in the direction of the arrows and schematically illustrating the discharge means;

Figure 1:
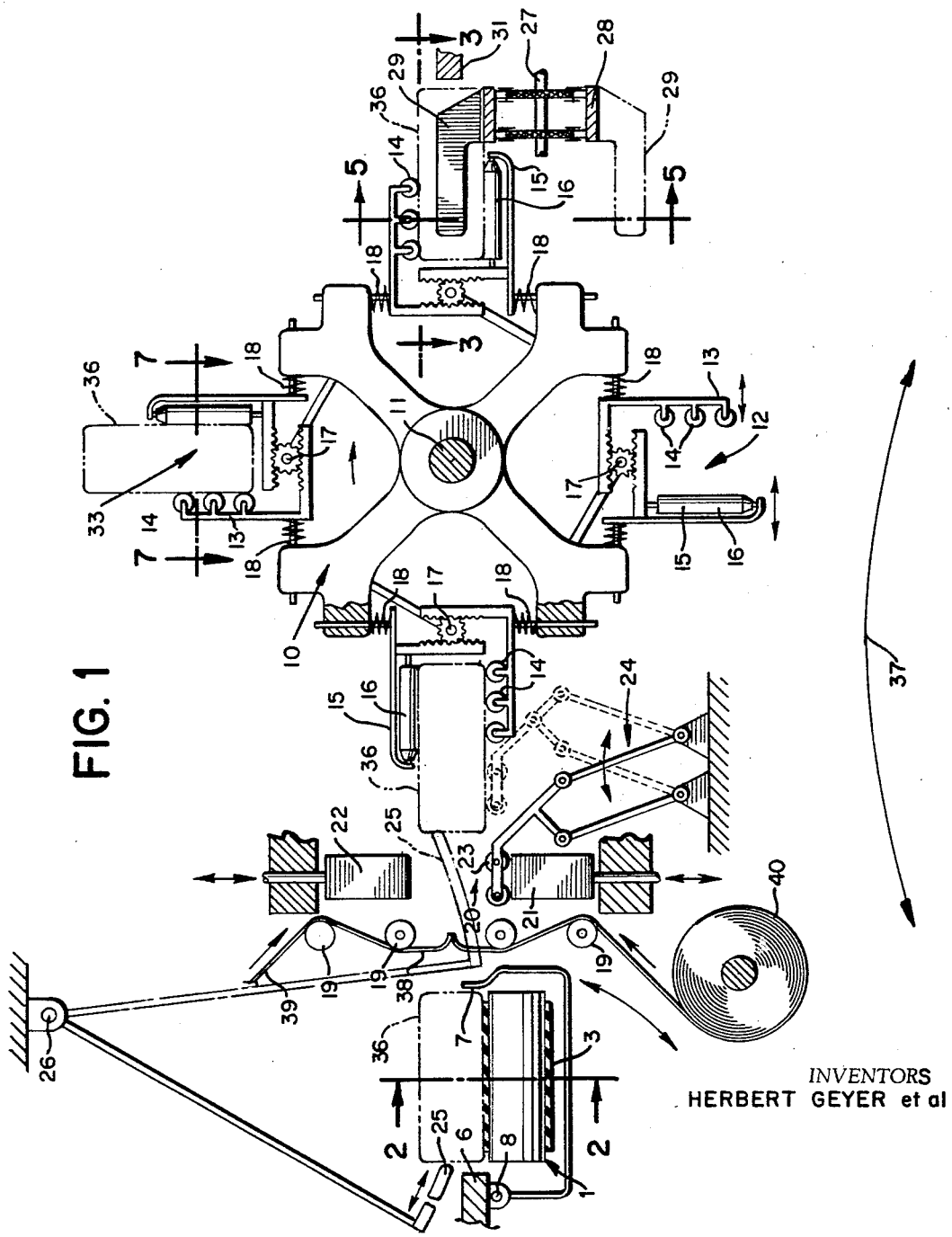
FIG. 1 is a schematic illustration of one possible embodiment of a machine according to the present invention, FIG. 1 being taken in a sectional plane which extends transversely across the directions in which the articles are moved during feeding thereof to and discharge thereof from the machine.
Figure 6:
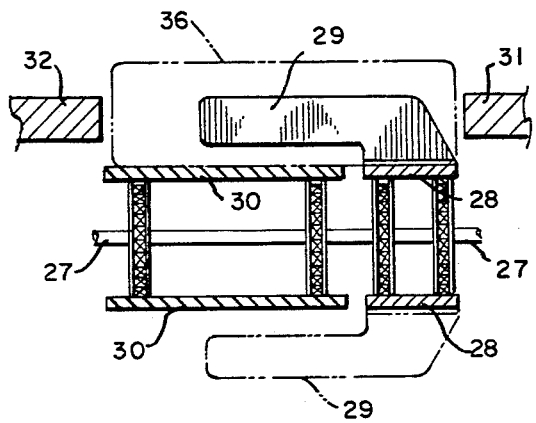
FIG. 6 is a schematic transverse section of the structure of FIG. 5 taken along 6—6 of FIG. 5 in the direction of the arrows.

In the illustration of FIG. 1 the primary components of the machine of the invention are shown in their functionally interrelated positions.

Thus, the machine includes a feeding means 1 for feeding the articles to the machine, and this feeding means is shown in greater detail in FIG. 2. The feeding means includes a pair of endless bands 2 and 3 extending in the feeding direction and spaced one behind the other, these feeding bands 2 and 3 being horizontally positioned so as to feed articles situated on the upper runs thereof from the right toward the left as viewed in FIG. 2. The feeding means 1 includes, between its endless bands 2 and 3, an accelerating roller 4 having an axis of rotation which extends transversely with respect to the feeding direction. The exterior surface of the accelerating roller 4 is situated at its uppermost part somewhat higher than the feeding plane defined by the upper surfaces of the endless bands 2 and 3.

Situated over that side of the accelerating roller 4 which is directed toward the first feeding band 2 as a pawl 5 which can swing to and from a position holding the articles back on the band 2 before releasing the articles one at a time so as to reach the accelerating roller 4. As may be seen from FIG. 1, there is situated to one side of the feeding means 1 a rotary transverse transporting means 10 including at least one star wheel, and at the side of the feeding means 1 which is directed away from the transporting means 10, the feeding means 1 includes an elongated stationary guide 6 which engages one side of the blocks which are fed by the feeding means. At the other side the blocks are engaged by a movable guide 7 which is supported for swinging movement about an axis 8 situated beneath the stationary guide 6 at the elevation of the feeding plane defined by the second band 3, the guide 7 also extending parallel to the feeding direction for maintaining the articles in the horizontal linear feeding path provided by the feeding means 1.

At the end of the band 3, which is distant from the accelerating roller 4, is situated a stop member 9. This stationary stop member 9 is located in the path of movement of the articles so as to terminate the movement thereof by the feeding means. Both the band 2 and the band 3 are capable of frictionally sliding with respect to the articles which are advanced thereby, so that when the articles are maintained stationary either by the pawl 5 or the stop 9 the endless bands can continue to move. These bands as well as the accelerating roller 4 are driven through any suitable driving structure which forms no part of the present invention and therefore is not illustrated.

The transverse transporting means 10 includes at least one star wheel shown in FIG. 1 and situated in a plane which is perpendicular to the feeding direction provided by the feeding means 1. This rotary transverse transporting means 10 is carried by a shaft 11 which is supported for rotary movement in suitable bearing and which has its axis extending parallel to the feeding direction. This axis of the rotary transporting means 10 is situated at an elevation which is approximately midway between the upper and lower surfaces of the articles which are to be packed. In other words, the axis of the shaft 11 is situated higher than the feeding plane by a distance approximately equal to one half the thickness of the articles.

The star wheel of the rotary transporting means 10 has a plurality of arms which respectively carry article-gripping means 12 which are acted upon by a spring means for gripping the articles. Each article-gripping means 12 includes one movable roller-supporting member 13 supporting a plurality of rollers 14 for rotation. These rollers 14 extending parallel to the shaft 11 along the length of the star wheel 10. Each gripping means 12 also includes a second movable roller-carrying member 15 which supports a plurality of rollers 16 which extend perpendicularly with respect to the shaft 11. The movable roller-carrying members 13 and 15 are movable toward each other during closing of the gripping means and away from each other during opening thereof.

As the rotary transporting means 10 is turned in a stepwise manner in a clockwise direction, as viewed in FIG. 1, to successively locate the plurality of gripping means at the several circumferentially distributed working stations, each gripping means will assume an article-receiving position, in which the left gripping means 12 of FIG. 1 is shown. Thus, as each gripping means 12 reaches its article-receiving position it is directed toward the feeding means 1. In this position the rollers 14, which extend parallel to the shaft 11, are situated below the rollers 16, and in the open position of the gripping means 12 these lower rollers 14 have their uppermost surfaces situated at approximately the same height as the feeding plane defined by the feeding means 1.

A coupling means 17 couples the roller-carrying members 13 and 15 to each other so as to maintain them at all times symmetrically situated with respect to the shaft 11. In other words, the drive 17 compels the members 13 and 15 to move equally and oppositely with respect to each other so that they are at all times symmetrically situated with respect to the shaft 11. Thus, the members 13 and 15 respectively carry parallel racks which mesh with a rotary pinion situated between the racks and carried by a suitable bracket fixed to the star wheel, so that in this way, although the pair of members 13 and 15 may move between open and closed positions, nevertheless these members 13 and 15 are compelled to move equally and oppositely. Thus, irrespective of the position of the gripping means 12, the spaces between the rollers 14 and 16 will be symmetrically situated with respect to shaft 11.

The displacement of the gripping means 12 to its closed position is brought about by springs 18 which form a spring means acting on the members 13 and 15 to urge them toward each other in the manner shown in FIG. 1. An illustrated control structure displaces the elements 13 and 15 apart from each other in opposition to the springs 18 to their open position. This control structure takes the form for example, of a suitable cam situated in the path of movement of projections of the elements 13 and/or 15 to engage these projections and displace them together with the elements in response to rotation of the star wheel, in opposition to the springs 18, to the open position of the gripping means. Inasmuch as this latter control structure also forms no part of the present invention, it is not illustrated.

Figure 8:
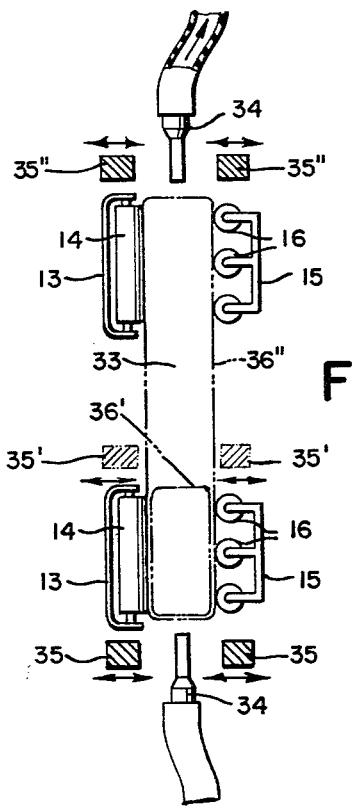
FIG. 8 shows, in a view similar to that of FIG. 7, a different embodiment of the structure which is illustrated in FIG. 7.

As is illustrated in FIGS. 4 and 8, instead of being composed of a single star wheel, the transporting means 10 can be composed of two or more star wheels situated on the common shaft 11 and arranged parallel to each other, perpendicularly to the shaft 11 at a predetermined distance from each other so that the plurality of star wheels will turn together as a unit, and the individual star wheels of such a group of star wheels may be relatively small. In this way, even such relatively small star wheels are capable of handling articles 36' and 36" which are of different lengths, and thus the single machine is capable of handling these articles which are of different length. Thus, FIG. 8 shows how a single article 36' will be handled only by the lower gripping means of FIG. 8 while a longer article 36" will be handled by the pair of gripping means shown in FIG. 8, such a pair of gripping means, of course, being carried by a pair of arms of a pair of star wheels mounted on a common shaft 11.

The supply means for supplying the sheet material which is to form the packages in which the articles are located is situated beside the feeding means 1, between the latter and the transporting means 10 but closely adjacent to the feeding means 1. Thhis supply means includes a plurality of guide rollers which guide the sheet material, and these guide rollers include a pair of inner guide rollers 19 which are spaced one above the other by a distance approximately equal to the thickness of the articles which are to be packed. The surfaces of the rollers 19 which are directed toward the article 36 which is to be packed are spaced from each other by a distance approximately equal to the distance between the rollers 14 and 16 when a gripping means 12 is in its open position and situated at the article-receiving position. Thus, the upper roller 19 will have its lowermost surface situated approximately at the same elevation as the lowermost surfaces of the rollers 16 of the left gripping means of FIG. 1, while the lower roller 19 will have its uppermost surface situated at approximately the same elevation as the uppermost surfaces of the rollers 14 of the left gripping means of FIG. 1.

A sealing means 20 is situated between the guide rollers 19 and the transporting means 10, and this sealing means is capable of welding together, or otherwise sealing, the sheet material supplied by the sheet-material supplying means which includes the guide rollers 19. The sealing means 20 will seal the sheet material in a plane which extends horizontally at the elevation of the axis of the shaft 11 so as to include this latter axis. This sealing means 20 includes a lower sealing jaw 21 which in its initial position is situated at a greater distance from the sealing plane than the upper jaw 22. so that in this way it is possible to arrange over the lower jaw 21 one or more supporting rollers 23 which form a supporting roller means to support each article as it is displaced into the left gripping means 12 of FIG. 1.

This supporting roller means 23 is situated between the lower inner guide roller 19 for the sheet material and the lower rollers 14 of the left gripping means 12 which is in the article-receiving position. The rollers 23 which form the supporting roller means, extend parallel to the shaft 11 and are displaceable in an approximately straight path back and forth toward the shaft 11, so that the plane which includes the uppermost surfaces of the rollers 23 remains in the feeding plane defined by the feeding means 1. A controlling linkage 24, which may be in the form of a parallelogram linkage, is swung back and forth through any suitable drive and is operatively connected with the roller-supporting means 23 so as to shift the latter between the solid and dot-dash-line positions shown in FIG. 1. If desired, the roller 23 may have stationary axes, in which case they remain only at the dot-dash line position indicated in FIG. 1.

Over the feeding means 1 is located a shifting means 25 which is swingable back and forth toward and away from the gripping means 12 which is in the article-receiving position. This shifting means 25 swings about an axis defined by a pivot 26 which extends parallel to the shaft 11. Thus, the shifting means 25 moves transversely to the feeding direction of the feeding means 1. In its starting position the end of the feeding means 25 which is directed toward the transporting means 10 is situated over the stationary guide 6 just in advance of its article engaging position engaging the article slightly higher than a central plane situated midway between the upper and lower surface of the article. At its end position shown in dot-dash lines in FIG. 1, the end of the shifting means 25 is located substantially in the same plane as those surfaces of the sealing jaws 21 and 22 which are directed toward the transporting means 10.

At the side of the transporting means 10 which is opposite from the feeding means 1, there is situated a discharge means 27 which is located at the same elevation as the feeding means 1 and which extends parallel thereto, so that the discharge means 27 will provide for the articles a plane of discharge movement which is at the same elevation as the feeding plane provided by the feeding means 1.

The discharge means 27 includes, as shown in FIGS. 3–6, an outer endless conveyor 28 having transversely extending elements fixed to the links of a sprocket chain which may be driven by suitable sprocket wheels, and these elements of the conveyor are fixed at suitable intervals to transporting arms 29 which extend from the outer conveyor 28 toward the transporting means 10 for successively engaging articles which are at the discharge position to which they are transported by the transporting means 10.

A second conveyor 30 forms part of the transporting means 27. This second conveyor is an inner conveyor situated between the outer conveyor 28 and the transporting means 10. Thus, the conveyor 30 is situated in the immediate vicinity of the transporting means 10, and this conveyor 30 also includes a plurality of linked elements forming an endless band driven by a suitable sprocket assembly, for example. Thus, the conveyors 28 and 30 can take the form of suitable bands or chains. The outer conveyor 28 is situated outwardly beyond the circular path of movement of the plurality of article gripping means 12 which turn with the transporting means 10, but the conveyor 28 extends along the entire length of the transporting means 10. The inner conveyor 30 is arranged in such a way that at one end it is located closely adjacent to an end of the start wheel of the transporting means 10 in alignment with the article carried by the right gripping means 12 of FIG. 1, this right gripping means being in the discharge position. Thus, in the case where a plurality of parallel star wheels are carried by the common shaft 11 and spaced from each other therealong so as to be capable of handling longer articles, as indicated in FIG. 8, there will be situated in the spaces between the successive star wheels separate conveyors 30 as shown most clearly in FIG. 4.

The conveyors 28 and 30 support the lower surfaces of the articles in a discharge plane whose elevation is approximately the same as the plane which includes the uppermost surfaces of the rollers 16 of the gripping means 12 which is in its open discharge position shown at the right in FIG. 1. A pair of stationary article guides 31 and 32 (FIGS. 3 and 4) are situated beside the discharge means 27 for engaging the sides of the packed articles so as to guide them reliably for movement along the discharge path.

Figure 7:
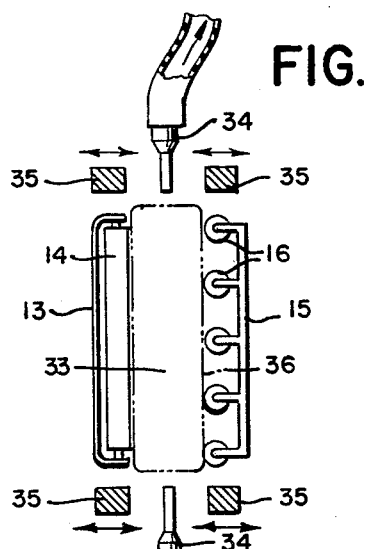
FIG. 7 is a sectional plan view of the upper working station, taken along line 7—7 of FIG. 1 in the direction of the arrows and showing the structure in a schematic fragmentary manner.

In the case where the single rotary shaft 11 carries two or more parallel star wheels which turn as a unit, as shown in FIG. 8, there will be, during the treatment of articles 36' or 36" of different lengths, beside the sealing means 35 additional sealing units 35' and 35" situated for proper operation on the sheet material in which the articles are located. Evacuating devices 34, schematically illustrated in FIGS. 7 and 8, are provided for evacuating the packages prior to the final sealing thereof.

The above-described machine operates as follows:

Relatively large substantially square-shaped blocks form the articles which are to be packed, these blocks being, for example, blocks of frozen fish. In the case where these blocks are of an elongated configuration, they are positioned so as to be longitudinally moved. They are placed either mechanically or by hand in a continuous manner one behind the other haphazardly at lesser or greater distances one from the other on the feeding means 1. In accordance with the requirements encountered at sea, the machine is set up on board ship in such a way that the feeding direction provided by the feeding means 1 and the discharge direction provided by the discharge means 27 both extend longitudinally of the ship. Because of the rolling of the ship the machine tends primarily to move transversely with respect to the directions in which the articles are moved by the feeding and discharge means, so that the feeding means 1 and the discharge means 27 move the articles transversely with respect to the accelerating forces 37 indicated at the lower part of FIG. 1. These forces extend in the rolling direction of the ship, and during operation of the machine while the ship is travelling at sea there will be continuous relatively large changes in these accelerating forces acting on the machine and the articles. Thus, the guides 6 and 7, which are respectively stationary and movable, reliably maintain the articles along the required path of feeding movement in opposition to the accelerating forces 37 which tend to displace the articles from the predetermined feeding direction.

The accelerating roller 4 has a circumferential speed at its outer surface which is greater than the speed with which the articles are moved by the band 2, so that each article 36 which is engaged by the accelerating roller 4 is pulled away from the band 2 and delivered to the band 3 whose feeding speed is approximately the same as the circumferential speed of the accelerating roller 4. Each article is in this way transported up to the stop 9, and the pawl 5 moves into the space behind the article 36 which is pulled away from the band 2 by the accelerating roller 4 so that in this way it is possible to maintain the desired individual spacing between the several articles. The pawl 5 is intermittently swung to and from its article-engaging position to provide a predetermined spacing between the articles.

In suitable timed relation with the other components of the machine, the guide means 7 is displaced downwardly away from its upper operating position shown schematically in FIG. 1 and then back up to its operating position. After the guide means 7 is swung downwardly away from its operating position, the article 36 which has been transported into engagement with the stop 9 is engaged by the shifting means 25 which pushes the article through the plane occupied by the curtain 38 of sheet material which is to form the package. During its displacement by the shifting means 25 through the plane occupied by the curtain 38, the sheet material together with the article are shifted by the shifting means 25 through the jaws 21 and 22 of the sealing means 20, these jaws at this time being in their open position. The supporting roller means 23 will at this time support the article 36 with a layer of sheet material between the rollers 23 and the article as the article and the sheet material move into the gripping means 12 which is situated at the article-receiving position. Due to this movement of the supporting roller means 23 by the linkage 24 the article is continuously supported as it is displaced into the gripping means.

The guiding of the article 36 in opposition to the accelerating forces 37 takes place on the one hand by way of the shifting means 25 and on the other hand by the pressure which the sheet material 38 provides on the article, since during movement of the article into the gripping means which is at the article-receiving position there is no relative movement between the article 36 and the sheet material which assumes automatically a substantially U-shaped configuration wrapped in part around and engaging the article.

As a result of this displacement of the sheet material it is drawn along the guide rollers 19 from unillustrated supply rolls of sheet material which are situated above and below the guide rollers 19 to provide the strips 39 and 40 of sheet material which are drawn under tension from the supply rolls as the article is displaced by the shifting means 25 into the gripping means 12 which is shown at the left in FIG. 1.

The shifting means 25 remains in its end position nearest to the transporting means 10 until the lower jaw 21 has moved up to a position beside the supporting roller means 23 and the jaw 22 has moved downwardly toward the lower jaw 21 to an extent sufficient to define between the jaws 21 and 22 a space which is less than the thickness of the article 36. Then the shifting means 25, which up to this time in cooperation with the sheet material 38 or the inner end of the gripping means 12 has reliably positioned the article 36 laterally in opposition to the accelerating forces 37, is displaced away from the transporting means 10 back to its starting position, and as soon as the shifting means 25 returns to its starting position the pawl 5 is raised so that the next article can be transported by the accelerating roller 4, the pawl 5 then moving back down to its holding position holding back the series of articles which are waiting to be successively transported to the stop 9. Thus, during the entire operating cycle of the shifting means 25 there is no article situated between the pawl 5 and the stop 9. It is only when the shifting means 25 returns to its starting position that the pawl 5 will release the next article to be transported to the stop 9 so as to become situated between the shifting means 25 and the sheet material supply means.

A suitable intermittent drive means, such as a geneva motion, is operatively connected with the shaft 11 to intermittently rotate the latter, and in the illustrated example the shaft 11 together with the star wheels carried thereby will turn through an angle of 90°, since there are four gripping means 12 carried by each star whel and uniformly distributed about the shaft 11. Of course, a single star wheel may be provided to carry only four gripping means 12, or two or more star wheels may be provided, as indicated above in connection with FIGS. 4 and 8.

During the initial part of the turning movement of the rotary transport means 10, the cam which holds the left gripping means of FIG. 1 in its open position no longer acts on this left gripping means since the pin which engages the cam is displaced away from the latter and thus the springs 18 immediately close the gripping means which now grips the article with the sheet material extending around the article. As is apparent from FIG. 1 the gripping means extends only along part of the article so that each article extends beyond each gripping means 12 to a substantial distance. Irrespective of the particular variations in the thickness of the article, it will be centrally positioned with respect to the shaft 11 due to the symmetrical coupling of the roller-carrying members 13 and 15 by the coupling means 17 as described above, and thus when the springs 18 cause the gripping means to close on the article, the article will necessarily be symmetrically positioned with respect to the axis of the rotary transporting means.

Before being displaced from the position shown in FIG. 1, the sheet material which is automatically wrapped around each article due to movement of the article by the shifting means 25 into the gripping means 12 which is at the receiving position, is acted on by the sealing jaws 21 and 22, of the sealing means 20 which provide in a known way on the sheet material just to the left of the article, as viewed in FIG. 1, a pair of sealed lines which are spaced from each other. In addition the sealing means will cut through the sheets between these sealed lines, so that on the one hand the portion of the sealing material which surrounds the article is sealed at one end thereof while at the same time the strips 39 and 40 are joined together to form the curtain 38 extending between the inner pair of rollers 19. Although it is possible for the sealing means 20 to be constructed so as to provide longitudinal seals along the sides of the article as well as the above seal at the end thereof, it is preferred to leave the sides open so that the interior of the package can be evacuated when each article is transported to the upper working station shown in FIG. 1. The jaws 21 and 22 of the sealing means 20 will be displaced back to their open position before the transporting means 10 turns so as to transport the article held by the gripping means 12 to the upper working station 33.

In a known way, an evacuating means 34 cooperates with the sheet material at the working station 33 so as to evacuate the interior of the package, and then the sides of the sheet material which project the article are sealed to each other to provide longitudinal seals, so that in this way the article is both evacuated and sealed. With the construction of FIG. 7 it is the jaws 35 which form the pair of seals along the sides after evacuation has been provided by the evacuating means 34. With the arrangement of FIG. 8, the jaws 35 and 35' will operate with relatively small articles 36' whereas the jaws 35 and 35" will seal the sheet material for the longer articles 36" which are located at the working station 33 shown in FIG. 8. The same working station 33 is shown in FIG. 7 as well as indicated in FIG. 1 above the shaft 11. Thus, the packing of each article is finished at the working station 33, and of course simultaneously with the operations taking place at the working station 33 the above-described operations have been repeated for the next article, with the next gripping means 12 which has been displaced to the article-receiving position shown at the left in FIG. 1.

Now the transporting means is again turned through an increment of 90° so that the completely packed article is now brought to the discharge means 27 where an illustrated cam again cooperates with the gripping means to automatically displace it to its open position in opposition to the springs 18. At this time the finished package will rest on the rollers 16 of the gripping means which is at the discharge position, and an arm 29 of the conveyor 28 will engage the finished package and displace it out of the gripping means onto the conveyor 30. In this way the articles are displaced from the transporting means 10 onto the discharge means 27 to be frictionally carried longitudinally of the ship away from the machine to a suitable location. This operation takes place without any relative movement between the packed article 36 and the discharge means 27, and lateral guiding of the article in opposition to the accelerating forces 37 is brought about at this time by way of the stationary guide 31 and the inner end of the open gripping means 12 as well as by the other stationary guide 32.

Each gripping means 12 remains empty as it turns first to the lowermost position shown in FIG. 1 and then back to the article-receiving position shown at the left in FIG. 1.

It is to be noted that with the above-described structure of the invention, the arrangement of the transverse transporting means 10 between the feeding means 1 and the discharge means 27 with shaft 11 extending parallel to the feeding direction and discharge direction provides a machine of exceedingly short length which can be easily accommodated on board ship and adapted to the stringent space requirements of such a ship.

The movable guide 7 guarantees reliable guiding of the article until the time when it is transversely shifted to the transverse transporting means. Moreover, the shifting means 25 together with the curtain of sheet material initially and the gripping means 12 thereafter reliably hold the article even though a certain instability is induced in the atricle due to the rolling or even pitching movements of the shift.

The articles also are securely handled by the gripping means so that they are properly treated with the machine in spite of the acceleration forces resulting from the movement of the ship.

The above-described particular arrangements of the rollers 14 and 16 on the movable elements 13 and 15, respectively, of the gripping means 12 is of particular advantage, since in the article-receiving position shown at the left of FIG. 1 the rollers 14 extend in a direction which greatly reduces the frictional resistance to movement of the article into the gripping means, these rollers 14 at this time being situated below the article to support the same. In the discharge position shown at the right in FIG. 1, it is the rollers 16 which are in the lower position, and at this time these rollers 16 will support each article for movement with little friction in the discharge direction, so that the particular arrangement of the rollers 14 and 16 substantially eliminates frictional resistance to movement of the articles and at the same time very favorably influences the packages since they will be protected in this way against any damage during handling thereof. This feature is of particular significance in connection with articles such as frozen blocks of fish which are hard and have sharp edges which are very likely to tear the sheet material of the package. Because of the extremely low degree of friction resulting from the roller arrangements described above, the possibility of tearing of the packing material is reliably avoided.

In addition, the location of the conveyor 30 of the discharge means in a position where it forms an extension of the particular rollers 16 which are located at the discharge position results in an exceedingly compact structure which requires only a small amount of space since the width of the entire machine is greatly reduced in this way.

Furthermore, the arrangement of a plurality of star wheels with the plurality of gripping means carried thereby enables the same machine to handle relatively long or relatively small articles, as pointed out above in connection with FIG. 8.

What is claimed is:
1. In a machine for packing, in a sealable sheet material, blocks, such as blocks of frozen fish, under conditions where the machine is moving in a given direction and changing its attitude, such as on board a moving ship at sea, comprising:
 (a) feeding means for feeding the blocks one after the other along a linear substantially horizontal path which extends transversely with respect to the direction in which the machine tends primarily to move, said path being located in a predetermined horizontal feeding plane, an elongated stationary guide extending parallel to said path for engaging the blocks on one side thereof, opposed movable guide means extending parallel to said stationary guide on the other side of said path therefrom for engaging the other side of the blocks, said opposed guide means being displaceable to and from a position extending across said plane for guiding the blocks, and a stop situated in the path of movement of each block fed by said feeding means to terminate the movement thereof;

(b) elongated substantially horizontal discharge means extending parallel to and situated at the same elevation as but spaced laterally from said feeding means for discharging the packed articles along a second linear substantially horizontal path, stationary guide means situated beside said discharge means for guiding the packed articles during movement thereof by said discharge means;

(c) rotary transverse transporting means situated between said feeding means and discharge means and carrying a plurality of article-gripping means for successively gripping successive articles and transporting them, during rotation of said rotary transporting means, from said feeding means to said discharge means, said rotary feeding means having an axis of rotation which extends parallel to said feeding and discharge paths and which is situated higher than said feeding plane by a distance approximately equal to one half the thickness of the blocks;

(d) sheet-material supply means and sealing means for sealing sheet material supplied by said sheet material supply means, said supply means and sealing means both being situated adjacent each other between said feeding means and said transverse transporting means;

(e) supporting roller means including at least one roller having an axis parallel to said axis of said transporting means, said roller means having an exterior surface extending at its uppermost part to the elevation of said feeding plane and being situated between said sheet material supply means and said transporting means for supporting an article for horizontal transverse movement from said feeding means toward said transporting means;

(f) shifting means acting between said feeding means and transporting means for transversely shifting an article from said feeding means, after engaging said stop, transversely to one of said article gripping means carried by said transporting means; and (g) second sealing means situated over said axis of said transporting means above the latter between said feeding and discharge means for sealing sheet material in which a block is located.

2. The combination of claim 1 and wherein an evacuating means is located adjacent said second sealing means for evacuating the package before the latter is sealed by said second sealing means.

3. The combination of claim 1 and wherein said supporting roller means is mounted for lateral horizontal movement back and forth between said feeding means and transporting means.

4. The combination of claim 1 and wherein said feeding means includes a pair of endless feeding bands situated one behind the other along said feeding path and spaced from each other, and an accelerating roller situated between said endless bands and having an axis of rotation which extends transversely with respect to the feeding path, said accelerating roller extending to an elevation somewhat higher than said endless bands, and said feeding means including a pawl movable to and from the path of movement of the blocks to said accelerating roller for releasing them one at a time to said roller to be accelerated thereby away from the band which is most distant from said stop to the band which is between said accelerating roller and said stop, said accelerating roller having at its exterior surface a linear speed approximately equal to the speed of the band situated between said accelerating roller and said stop, and said latter speed being substantially greater than the speed of the band situated in advance of said accelerating roller at the side thereof which is distant from said stop.

5. The combination of claim 1 and wherein said discharge means includes an outer conveyor carrying a plurality of arms for respectively engaging articles and moving them along the discharge path and an inner conveyor situated closely adjacent to said transport means between the latter and said outer conveyor, said plurality of article-gripping means which are carried by said transverse transporting means being open when they reach a position directed towards said discharge means, and each of said gripping means including in the discharge position of each gripping means lower rollers which support each article for movement by said arms, said arms moving the articles from said lower rollers onto said inner conveyor and said inner conveyor and said outer conveyor supporting the articles at the same elevation as said lower rollers and forming a continuation of the plane in which the articles are supported by the lower rollers of the successive gripping means.

6. The combination of claim 4 and wherein said plurality of article-gripping means successively reach an article-receiving position where each of said gripping means is open for receiving an article from the endless band situated between said accelerating roller and said stop, each article-receiving means including a pair of roller-carrying members movable toward and away from each other to place said gripping means in gripping and non-gripping positions, respectively, one of said roller-carrying members carrying rollers which extend parallel to the axis of said transporting means and the other of said roller-carrying members carrying rollers which extend perpendicularly to said axis, and when each gripping means is in its article-receiving position, said rollers which extend parallel to said axis of said transporting means being situated beneath the rollers which extend perpendicularly thereto substantially at the same elevation as said endless band extending between said stop and said accelerating roller, and said gripping means engaging only part of an article so that the latter projects outwardly beyond the said gripping means when gripped thereby.

7. The combination of claim 6 and wherein a coupling means couples the pair of roller-carrying members of each gripping means to each other for symmetrical movement toward and away from each other to maintain said roller-carrying members symmetrically situated at all times with respect to said axis of said transporting means, and spring means acting on said roller-carrying members for urging them toward each other to a closed position of each article-gripping means.

8. The combination of claim 1 and wherein said sheet material supply means includes guiding rollers for guiding sheet material, said guiding rollers including a pair of inner guiding rollers between which each article passes during movement from said feeding means to a gripping means carried by said transporting means, and said pair of inner guiding rollers being spaced from each other by a distance approximately equal to the thickness of the article and situated respectively at approximately the same elevations as portions of each gripping means which in an open position of said gripping means are spaced from each other to receive an article.

9. The combination of claim 1 and wherein said supporting roller means is situated between said first-mentioned sealing means and said transporting means.

10. The combination of claim 1 and wherein said first-mentioned sealing means includes upper and lower sealing jaws, and said supporting roller means being situated over said lower sealing jaw, during the movement of said block toward said article-gripping-means.

11. The combination of claim 1 and wherein said shifting means is swingable about an axis extending parallel to said axis of said transporting means from a starting position situated over and adjacent said stationary guide which extends along said feeding means to an end position situated adjacent said first-mentioned sealing means.

12. The combination of claim 1 and wherein said first-mentioned sealing means is situated between said feeding means and said transporting means substantially at the elevation of said feeding plane and includes upper and lower sealing jaws, said lower jaw being situated at a substantial distance below said feeding plane in an open starting position of said jaws and said upper jaw in the open starting position of said jaws being situated relatively close to the elevation of the upper surface of a block engaging said stop.

13. The combination of claim 1 and wherein said rotary transporting means includes a pair of rotary star wheels each of which has a plurality of arms which respectively carry a plurality of said article-gripping means, said star wheels turning together about said axis of said transporting means and being situated at a predetermined distance from each other.

14. The combination of claim 13 and wherein part of said discharge means extends into the space between said pair of star wheels.

References Cited

UNITED STATES PATENTS

| | | | |
|---|---|---|---|
| 2,971,308 | 2/1961 | Hobbins | 53—225 |
| 3,271,923 | 9/1966 | Fullbrook | 53—229 X |

WILLIAM W. DYER, JR., *Primary Examiner.*

N. ABRAMS, *Assistant Examiner.*